(12) United States Patent
Yap et al.

(10) Patent No.: US 7,983,562 B1
(45) Date of Patent: Jul. 19, 2011

(54) DYNAMIC CODING FOR OPTICAL CODE-DIVISION MULTIPLE ACCESS

(75) Inventors: Daniel Yap, Newbury Park, CA (US); Keyvan Sayyah, Santa Monica, CA (US); Alexander Krayner, Los Angeles, CA (US)

(73) Assignee: HRL Laboratories, LLC, Malibu, CA (US)

(*) Notice: Subject to any disclaimer, the term of this patent is extended or adjusted under 35 U.S.C. 154(b) by 1615 days.

(21) Appl. No.: 11/174,354

(22) Filed: Jun. 30, 2005

(51) Int. Cl.
 *H04J 14/00* (2006.01)
(52) U.S. Cl. ............ 398/78; 398/77; 398/183; 398/202; 398/89; 370/320; 370/441; 370/335; 370/342; 375/146; 375/147; 375/130; 375/260; 385/24; 385/31; 385/15; 385/37
(58) Field of Classification Search .............. 398/72, 398/77–78, 74, 75, 76, 79, 89, 140, 141, 398/158, 159, 183, 189, 190, 192, 191, 202, 398/208, 186; 370/441, 335, 320, 342; 375/146, 375/147, 148, 130, 150, 260; 385/24, 37, 385/31, 3, 15
See application file for complete search history.

(56) References Cited

U.S. PATENT DOCUMENTS

| | | | | |
|---|---|---|---|---|
| 5,619,492 A * | 4/1997 | Press et al. | | 370/441 |
| 6,025,944 A * | 2/2000 | Mendez et al. | | 398/78 |
| 6,292,282 B1 | 9/2001 | Mossberg et al. | | 359/123 |
| 6,381,053 B1 | 4/2002 | Fathallah et al. | | 359/136 |
| 6,396,822 B1 | 5/2002 | Sun et al. | | 370/335 |
| 6,704,322 B1 * | 3/2004 | Niou et al. | | 370/441 |
| 7,068,881 B2 * | 6/2006 | Yoo | | 385/31 |
| 7,174,103 B2 * | 2/2007 | Nishiki et al. | | 398/77 |
| 7,272,318 B2 * | 9/2007 | Lee et al. | | 398/78 |
| 7,620,328 B2 * | 11/2009 | Toliver | | 398/188 |
| 2002/0176141 A1 * | 11/2002 | Ogmen et al. | | 359/173 |
| 2002/0181488 A1 * | 12/2002 | Okazaki et al. | | 370/441 |
| 2004/0081463 A1 * | 4/2004 | Kim et al. | | 398/78 |
| 2004/0208233 A1 * | 10/2004 | Dafesh | | 375/147 |
| 2005/0100338 A1 * | 5/2005 | Yeon et al. | | 398/78 |
| 2007/0110442 A1 * | 5/2007 | Peer | | 398/78 |

OTHER PUBLICATIONS

Salehi, J., "Code Division Multiple Multiple Acess Techniques in Optical Fiber Networks-Part 1 Fundamental Principles." *IEEE Transactions on Communications*, v. 37, n.8, pp. 824-833 (1989).

Kavehrad, M. and D. Zaccarin, "Optical Code-Division-Multiplexed Systems Based on spectral Encoding of Noncoherent sources." *Journal of Lightwave Technology*, v.13, No. 3, pp. 534-545 (1995).

Shah, J., "Optical CDMA." *Optics and Photonic News*, pp. 43-47 (Apr. 2003).

Lam, C et al, "Experimental Demonstration of Bipolar Optical CDMA System Using a Balanced Transmitter and Complementary Special Encoding." *IEEE Photonics Technology Letters*, v. 10, n.10,pp. 1504-1506 (1998.

Nguyen, L et al., "All Optical CDMA with bipolar codes." *Electronic Letters*, v. 31, n. 6, pp. 469-470 (1995).

* cited by examiner

*Primary Examiner* — Hanh Phan
(74) *Attorney, Agent, or Firm* — Ladas & Parry

(57) ABSTRACT

An apparatus and methods for encoding and decoding data are disclosed. The method for transmitting and receiving data allows for coding and decoding each bit of data with a different code. The transmitter and receiver devices allow encoding and decoding, respectively, each bit of data with different a code.

28 Claims, 9 Drawing Sheets

DYNAMIC CODING FOR OPTICAL CODE-DIVISION MULTIPLE ACCESS

FIELD

The disclosure relates generally to a dynamic encoding scheme.

BACKGROUND AND PRIOR ART

Code Division Multiple Access (CDMA) is a spread spectrum technique that permits a large number of separate users to share the same extended transmission bandwidth but to be individually distinguishable through the allocation of specific codes applied to the data being transmitted. CDMA has been applied with great success to the field of mobile communications but has only recently generated significant interest in the optical domain. The particular attractions of Optical Code Division Multiple Access (OCDMA) include the capacity for higher connectivity, more flexible bandwidth usage, improved cross-talk performance, asynchronous access and potential for improved system security. Optical code-division multiplexing can make use of the large transmission bandwidth made possible by low-loss optical fibers and optical amplifiers (such as erbium-doped fiber amplifiers). Such bandwidth can be much greater than 5,000 GHz.

There are two basic types of codes used for OCDMA networks. One type divides the available bandwidth of the medium into a number of frequency (or wavelength) slots, with each frequency slot being sufficiently large to accommodate the bandwidth of the data to be transmitted through the network by a user, the modulation method used to modulate that data onto the optical carrier (the light) and the characteristics of the filtering elements (such as the optical-wavelength multiplexers or filters). Different codes, having different patterns of frequency slots, are assigned to different users of the OCDMA network. The data bit stream is modulated onto those optical carriers having the frequencies of the frequency slots assigned for that user.

A second type of code divides each bit interval of the data into a number of shorter time slots ("time chips"). The transmitted signal, typically the amplitude or the phase of that signal, is modulated from one time chip to the next in a predetermined sequence. Another variation of these codes hops the frequency of the optical carrier from one time chip to the next, within a given bit interval. This variation can be called fast frequency hopped OCDMA and is described in U.S. Pat. No. 6,381,053. A more general method for assigning frequency slots to time chips is described in U.S. Pat. No. 6,292,282. For all of these types, only one code is assigned to a user for the duration of its transmission.

The signal quality obtained by a user in an OCDMA network depends on the number of simultaneous users of that network. All users of the network have approximately the same signal-transmission quality, provided their codes are assigned in an optimal manner. OCDMA networks are being envisioned for networks connected through free-space optical links and for fiber-optic networks in which only a smaller subset of the users physically connected are actively using the network at any time. In certain applications, some users of a network will need to have a better signal-transmission quality than other users. The presently disclosed invention provides a way for those more-demanding users to obtain that improved quality without making the OCDMA network itself or the components of the other users more complicated (i.e., imposing the cost of that improved quality on the other users).

Sun et al., in U.S. Pat. No. 6,396,822 discloses how data to be transmitted is partitioned into packets of bit sequences. Each packet is mapped to an orthogonal code in an assigned subset of codes. The number of members in a particular code subset is determined by the relative transmission requirements of the data signal that subset will be used to encode and is matched to those requirements. However, unlike the presently disclosed invention, Sun discloses a RF-CDMA system for which the wavelength-slot coding methods described in the embodiments of the present invention would not be suitable. Further, Sun addresses the issue of different packets of data in a bit-stream having different transmission requirements, whereas the presently disclosed invention addresses the issue of different users of an OCDMA network having different transmission requirements. Finally, the dynamic assignment of codes in Sun, et al. are done by a network controller, whereas the dynamic assignment of codes in the presently disclosed invention may be done cooperatively by a group of network users (or by a single user) and without the network controller even knowing about their use of dynamic codes.

In terms of background information, Salehi discusses the fundamental principles for OCDMA using time-slot codes in IEEE Transactions on Communications, v. 37, n. 8, pp. 8824-833 (1989) and Kavehrad and Zaccarin discuss frequency slot encoding for OCDMA in J. Lightwave Technology, v. 13, no. 3, pp. 534-545 (1995).

An OCDMA approach is described in an article by J. Shah (in Optics & Photonics News, April 2003, pp. 43-47) that uses combined time and frequency codes that involve multiple bits. A single code quasi-randomly fills a matrix of L wavelengths and N bit intervals, with the N bit intervals defining a "macro-bit". A code can occupy multiple wavelengths in a particular bit-time slot, or bit interval, and leave other bit-time slots empty (i.e., transmitting at no wavelengths). According to this approach, the L×N matrix is filled with integer numbers that are algorithmically generated from a seed. The code for the ith user is given by the locations in the matrix that are occupied by the number i modulo N. In such an approach, all of the users of the OCDMA network would need to employ macro-bit codes that are created as described above. The dynamic coding scheme disclosed herein likewise involves codes that extend over multiple bit intervals. However, in contrast to this prior approach, certain users of the presently disclosed OCDMA network could employ the dynamic codes, which extend over multiple bit intervals, and other users could employ conventional codes that extend over only a single bit interval. Note that since the presently disclosed dynamic codes are constructed from single-bit-interval codes, each user of the dynamic codes would transmit on at least one wavelength in each bit interval, in contrast to the prior "macro-bit" codes for which certain bit intervals can be empty.

Lam, et al., in IEEE Photonics Technology Letters, v. 10, n. 10, pp. 1504-1506 (1998) and Nguyen, et al., in Electronics Letters, v. 31, n. 6, pp. 469-470 (1995) describe bipolar wavelength coding that involves non-changing or static bipolar codes. However, the encoders of the presently disclosed invention change the bipolar code from one bit interval to the next and the decoders of the presently disclosed invention apply different bipolar codes to decode different bit intervals of the data.

A novel dynamic encoding scheme for improving the signal-transmission quality and security for users is presently disclosed.

Figure 1:
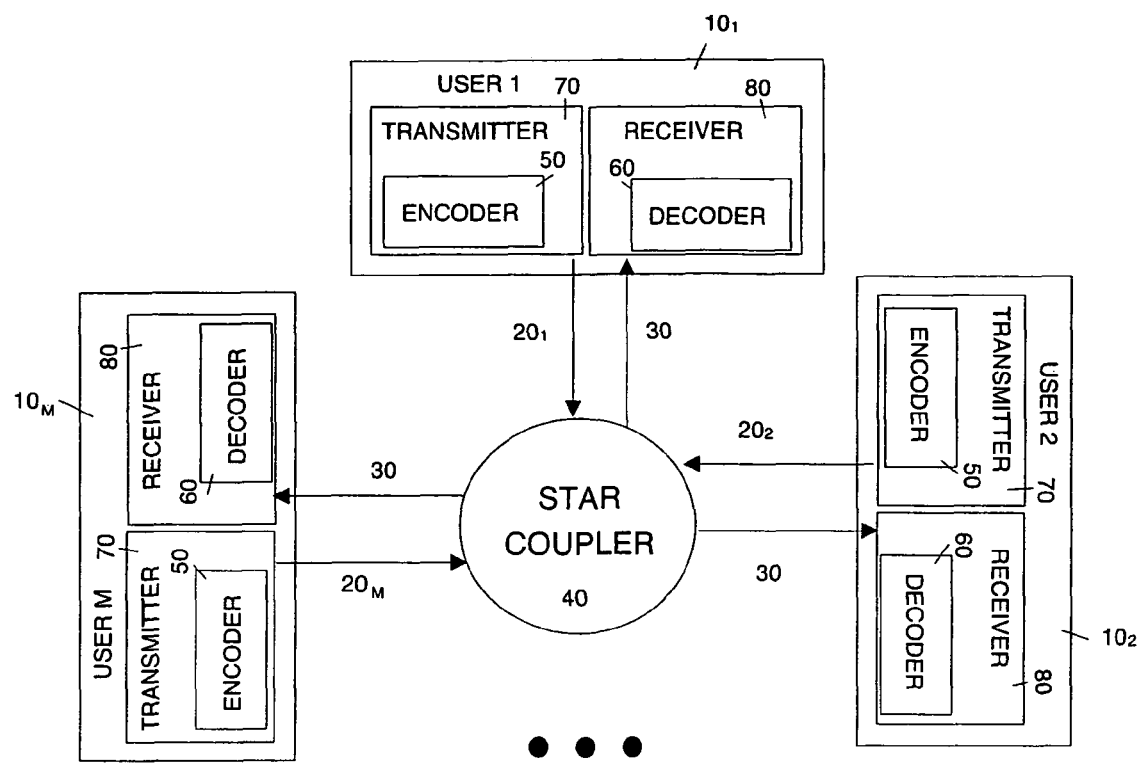
FIG. 1 is a block diagram showing an exemplary OCDMA network in a star configuration.

In the following description, like reference numbers are used to identify like elements. Furthermore, the drawings are intended to illustrate major features of exemplary embodiments in a diagrammatic manner. The drawings are not intended to depict every feature of every implementation nor relative dimensions of the depicted elements, and are not drawn to scale.

DETAILED DESCRIPTION

The novel dynamic encoding scheme presently disclosed significantly improves the signal-transmission quality and security for users in an OCDMA system. The presently disclosed approach is based on dynamically changing the code, using the time-wavelength space, for each bit of data, and possibly also in sub-bit periods of information, wherein the code sequence may repeat after a prescribed number of bits. The presently disclosed approach may especially be suitable for OCDMA networks that have users with varying needs for signal quality and security. The users who have more stringent signal integrity and security requirements may use the longer code lengths made available through dynamic encoding.

The novel dynamic encoding scheme presently described has the advantages of scaling flexibility as well as increased and selectable signal integrity. The flexibility in scaling is due to the ability to easily change the length of the dynamic code, which permits a capacity versus complexity tradeoff.

A dynamic coding scheme may be employed by a subset of users of an OCDMA network. In one implementation of this scheme, the members of the subset may pool together the codes (hereinafter called "code pieces") that may be assigned by the OCDMA network. The users may then construct another set of codes for use by the subset. The new codes may extend for several bit intervals. The new codes may consist of a sequence of multiple code pieces (which are selected from the pool of code pieces originally assigned to the subset members by the network). For each sequence, the code piece may change from one bit interval to the next, and possibly also in sub-bit periods of information. If the new sequence codes extend for a large number of bit intervals, a much larger number of possible sequences may be constructed than the number of code pieces used in their construction. Thus, the signal-transmission quality achieved for that subset of users employing dynamic codes may be much higher than the quality achieved for the remaining users of the OCDMA network who employ static codes. The formation of the subset of users and the sharing of their code pieces may be done apart from the knowledge or control of the OCDMA network controller or of the other users of that network. Users may also participate as a member of the subset just at those times when they need to have better signal-transmission quality or security and then terminate their participation and thereby no longer share their code pieces when that participation is not needed.

As an alternative, a given user may also be assigned multiple code pieces by the OCDMA network at, possibly, greater monetary cost to that user. The given user may then construct another set of codes that comprises sequences of those code-pieces, with the new codes extending over several bit intervals. Since the effective code length of the sequence may be much larger than the code length of a code piece, the given user may have better signal-transmission quality than the other users of the OCDMA network. The monetary price paid by the user (besides the monetary cost of being assigned more code pieces) is the need for having a dynamic encoder and a dynamic decoder, for which the code can be changed from one bit interval to the next. Each user with dynamic coding capability is assumed to have a Transmitter and Receiver pair with the transmitter containing a dynamic encoder and the receiver containing a dynamic decoder.

According to the present disclosure, the sequence codes may extend over multiple bit intervals of the data. In general, the more bit intervals that are used for the code and the more code pieces available for constructing that sequence code, the greater the improvement in signal quality may be. Since only a particular user's Transmitter and Receiver need to be aware of the use of multiple bit intervals to dynamically encode/decode and send data, the OCDMA network controller need not be concerned with the dynamic-coding operation. Only the users in an OCDMA network that require the improved performance of the dynamic coding need to have the more complicated encoders and decoders. Thus, dynamic coding may be compatible with OCDMA systems that also contain some users that employ only static coding.

According to the present disclosure, the exemplary embodiments may be applicable to data that contains some form of error correction. Note that in the dynamic coding OCDMA concept, several members of a subset may employ the same code piece for a given bit of data but they would employ non-identical code pieces for the other bits of data. With error correction, the data is treated not bit by bit but in larger groupings of bits. Thus, any reduction in signal-to-noise for a particular bit that would be produced by the concurrent sharing of code pieces among users of a subset might be compensated by the error correction procedure.

Although non-dynamic encoders and decoders are known in the art, several exemplary embodiments of dynamic encoders and dynamic decoders for OCDMA networks are described next. The exemplary embodiments described herein are based on bipolar code pieces containing multiple optical wavelengths. An advantage of bipolar wavelength-code pieces is that the average power transmitted by a user can be made to remain constant regardless of the specific bit pattern of the data. Other types of embodiments could be envisioned that are based on temporal code pieces having pulses shorter than a bit interval whose positions in a bit interval are set to establish a code. Two-dimensional code pieces based on a combination of pulse-position and optical-wavelength also could be adapted to the dynamic coding scheme of the presently disclosed invention. Also, other types of known codes in addition to the bipolar codes disclosed herein could be used in the context of the present invention.

Although embodiments for dynamic wavelength encoders and decoders are described presently, the principles presented may be applied to construct other encoders and decoders for the temporal and the two-dimensional (time/wavelength) code pieces.

Referring to FIG. 1, in one exemplary embodiment M multiple users $10_1, 10_2, \ldots, 10_M$ may be connected to the OCDMA network in a star configuration through star coupler 40. In the star configuration, the OCDMA bit stream from user 10₁, for example, may be sent to all of the remaining users 10₂, . . . , 10_M. Each user 10₁, 10₂, . . . , 10_M may employ an encoder 50 at an optical Transmitter 70 and a corresponding decoder 60 at an optical Receiver 80 to encode and decode data to be transmitted and received through the exemplary star configuration.

Figure 2:
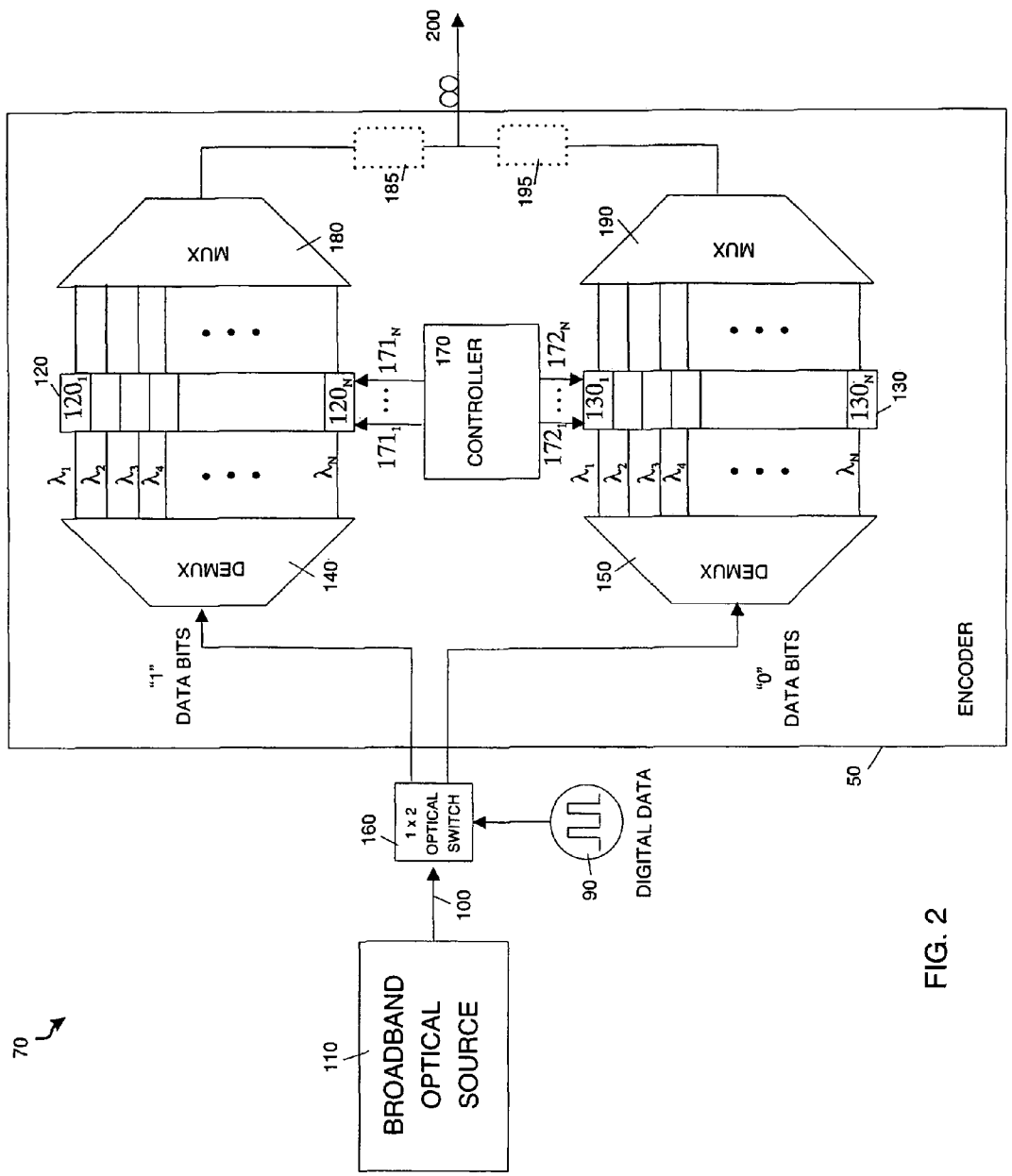
FIG. 2 is block diagram of an exemplary embodiment of an encoder of FIG. 1.

Referring to FIG. 2, in one exemplary embodiment of the Transmitter 70, a digital data 90 may be encoded by the encoder 50 wherein the encoder 50 may be used to change a bipolar wavelength code from one bit interval to another. The bipolar code may even be changed multiple times within a given data-bit interval, with the changes occurring at time slot (time-chip) intervals that are a fraction of the data-bit interval. This results in a dynamic, two-dimensional time-wavelength bipolar code.

Referring to FIG. 2, light 100 from a broadband or multi-wavelength optical source 110 may be switched to one of two arrays 120, 130 of high-speed optical modulators using, for example, a 1×2 optical switch 160 and digital data 90 that is to be encoded by the encoder 50. The 1×2 optical switch 160 may, for example, be an optical directional coupler switch that may transmit the light 100 to the array 120 when the digital data 90 is a data bit "1" and may transmit the light 100 to the array 130 when the digital data 90 is a data bit "0". Two optical-wavelength de-multiplexers 140, 150 may be used to spatially disperse the broadband or multi-wavelength optical spectrum light 100 into separate tones $\lambda_1 \ldots \lambda_N$ with each tone being modulated by modulators $120_1 \ldots 120_N$ within the array 120 and modulators $130_1 \ldots 130_N$ within the array 130. The modulators $120_1 \ldots 120_N$ of array 120 may impose a different time-dependent spectral code on the data, while the corresponding modulators $130_1 \ldots 130_N$ of array 130 may impose the complementary wavelength code. Controller 170 may be used to control high-speed optical modulator arrays 120, 130 through control lines $171_1 \ldots 171_N$ and $172_1 \ldots 172_N$ respectfully, wherein the number of control lines $171_1 \ldots 171_N$ and $172_1 \ldots 172_N$ corresponds to the number of modulators within modulator arrays 120, 130. The spectral code may be imposed at modulation speeds equal to or greater than the data rate. The modulated optical outputs of all the modulators are then multiplexed together by optical-wavelength multiplexers 180, 190 to form the encoded waveform. Thus for example, the wavelengths selected by modulator array 120 are transmitted when the digital data 90's data bit value is "1." The complimentary wavelengths, selected by modulator array 130, are transmitted when the digital data 90's data bit value is "0." The end result is a dynamically-encoded optical data stream 200 in which different sets of wavelength tones can be placed in the different time slots or bit intervals according to the value of the data bit and the code for that bit.

In another exemplary embodiment, it may be desirable to have the optical power in any chip interval be the same for the "1" data bits code and for the "0" data bits code. Using codes that fill half of the wavelength slots can accomplish this. The optical power is the sum of the powers in all of the transmitted wavelengths.

Alternatively, in another exemplary embodiment, an optical attenuator or gain element 185, 195 could be placed after either of the multiplexers 180, 190 to equalize the powers of the "1" and "0" data bits. For example, if there are twelve wavelengths that may be transmitted, with each wavelength having equal power, and four wavelengths are selected for the "1" data bits path and eight wavelengths are selected for the "0" data bits path a 3 db optical attenuator can be added to the "0" data bits path to equalize the transmitted powers. For another example, a ten wavelength code may have any three of those wavelengths assigned to the "1" data bits and the remaining seven wavelengths assigned to the "0" data bits. The relative weights produced by optical attenuators would then be zero-point-seven (0.7) and zero-point-tree (0.3) for the energies passed through the "1" data bits and the "0" data bits multiplexers 180, 190, respectively.

The characteristics of the optical-wavelength de-multiplexers 120, 130 and multiplexers 180, 190 of the encoder 50 and the format (e.g., intensity modulation) used for modulating the digital data 90 onto the light may affect the duration of the time chip. When the bandwidth of the user data 90 is comparable to the bandwidth allowed by a wavelength slot (or frequency slot), the duration of the time chip may be approximately equal to the bit interval. However, when the user data 90 has a smaller bandwidth, each bit interval may be divided into shorter time slots (time chips) and the spectral code may then be changed from one time chip to the next. The approach of achieving sub-bit-interval changes in the spectral code increases the code complexity for any bit of data, and thus results in improved signal-transmission quality, independent of the use of multiple-bit-interval dynamic coding. The sub-bit-interval coding, if employed by all users of a network, also improves the network capacity. It provides a two-dimensional time-wavelength code for each bit of data.

As an example, for data rates of ten (10) Gbps the granularity in wavelength may be as fine as twenty-five (25) GHz using conventional optical components. If the user, for example, desires to have a chip rate of four (4) times the bit rate (e.g., 40 giga-chips per second), a coarser wavelength granularity of one-hundred (100) GHz may be used. The components for implementing such fast encoding and decoding are available. For example, optical modulators, photoreceivers and associated electronic circuits capable of 40 Gbps modulation rates are currently commercially available, and will be significantly less expensive in the near future due to their anticipated high demand in the WDM optical fiber communication market.

Figure 3:
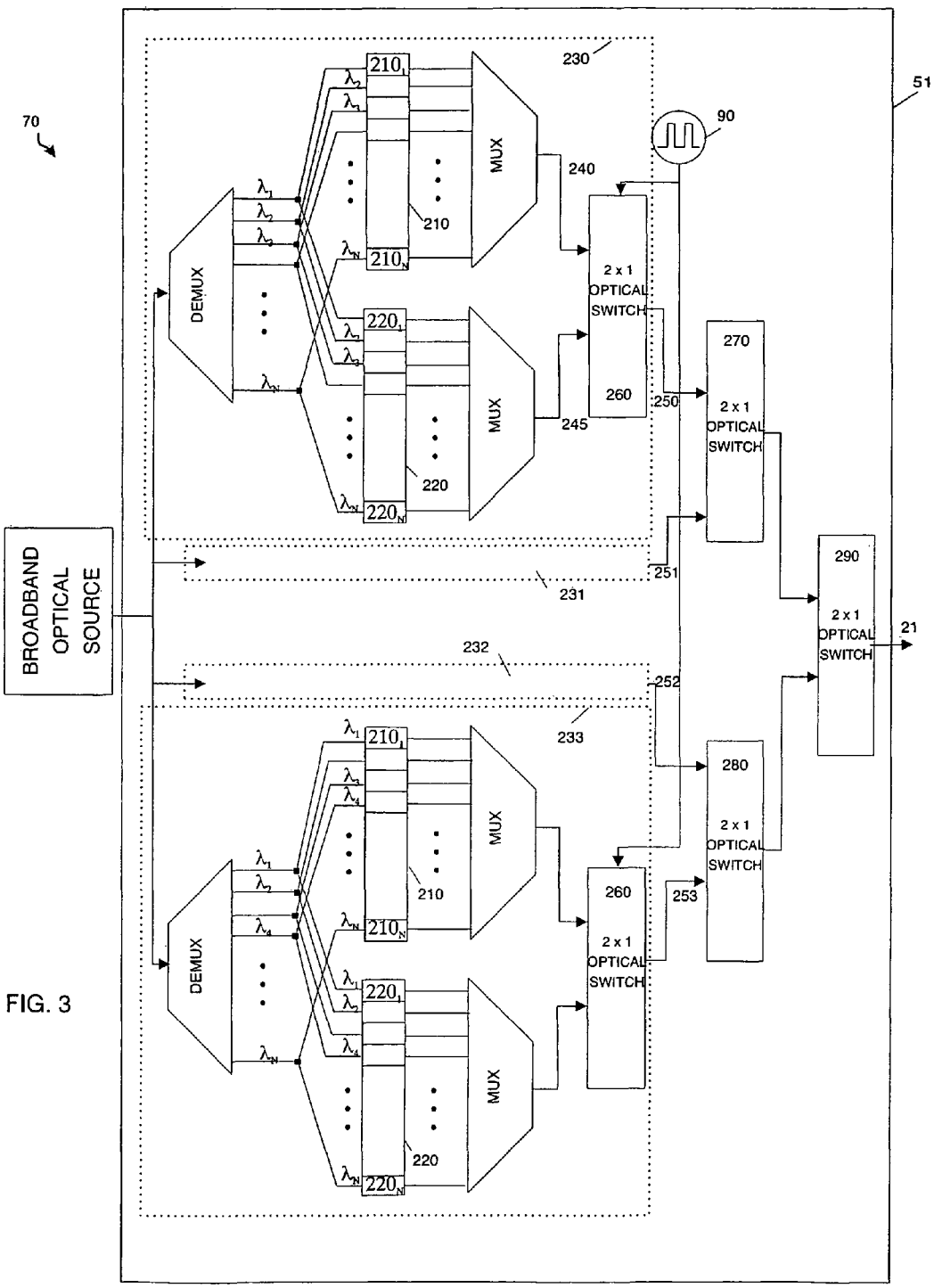
FIG. 3 is block diagram of another exemplary embodiment of an encoder of FIG. 1.

Referring to FIG. 3, in another exemplary embodiment of the Transmitter 70, the encoder 51 may be used to change a wavelength code from one bit interval to another in a bipolar fashion or even multiple times within a given data-bit interval. For illustrative purposes, the dynamic code repeats every four (4) time chips wherein the four spectral codes are imposed by wavelength encoding sets 230, 231, 232, 233. Although only the constituents of sets 230 and 233 are shown, it is to be understood that sets 230, 231, 232, 233 are the same. The encoder 51 switches between several different sets of lower-speed optical modulators. There may be two modulator arrays 210, 220 in each set 230, 231, 232, 233, which impose the binary spectral code characteristic of the sets 230, 231, 232, 233 respectively. One of the encoded outputs 240, 245 from the set 230 may, for example, be selected by a 2-to-1 optical switch 260 according to whether the digital data 90 to be encoded by the encoder 51 is a "1" (which selects output from modulator array 210) or a "0" (which selects output from modulator array 220). A grouping of three 2-to-1 optical switches 270, 280, 290 may then select one of the four bipolar encoded outputs 250, 251, 252, 253 from the four parallel sets 230, 231, 232, 233 to be the signal 21 transmitted for that bit interval (the first interval). A different output that is from another set may be selected for the next (second) bit interval. The process continues for the following (third) bit interval and again for the bit interval (the fourth) after that. The process then repeats for each grouping of 4 bit intervals in a cyclical manner. Optional optical attenuators or gain elements (not shown) could be added to the encoded outputs 240, 245 of each set to make the power for a "1" data bit equal the power for a "0" data bit.

Figure 4:
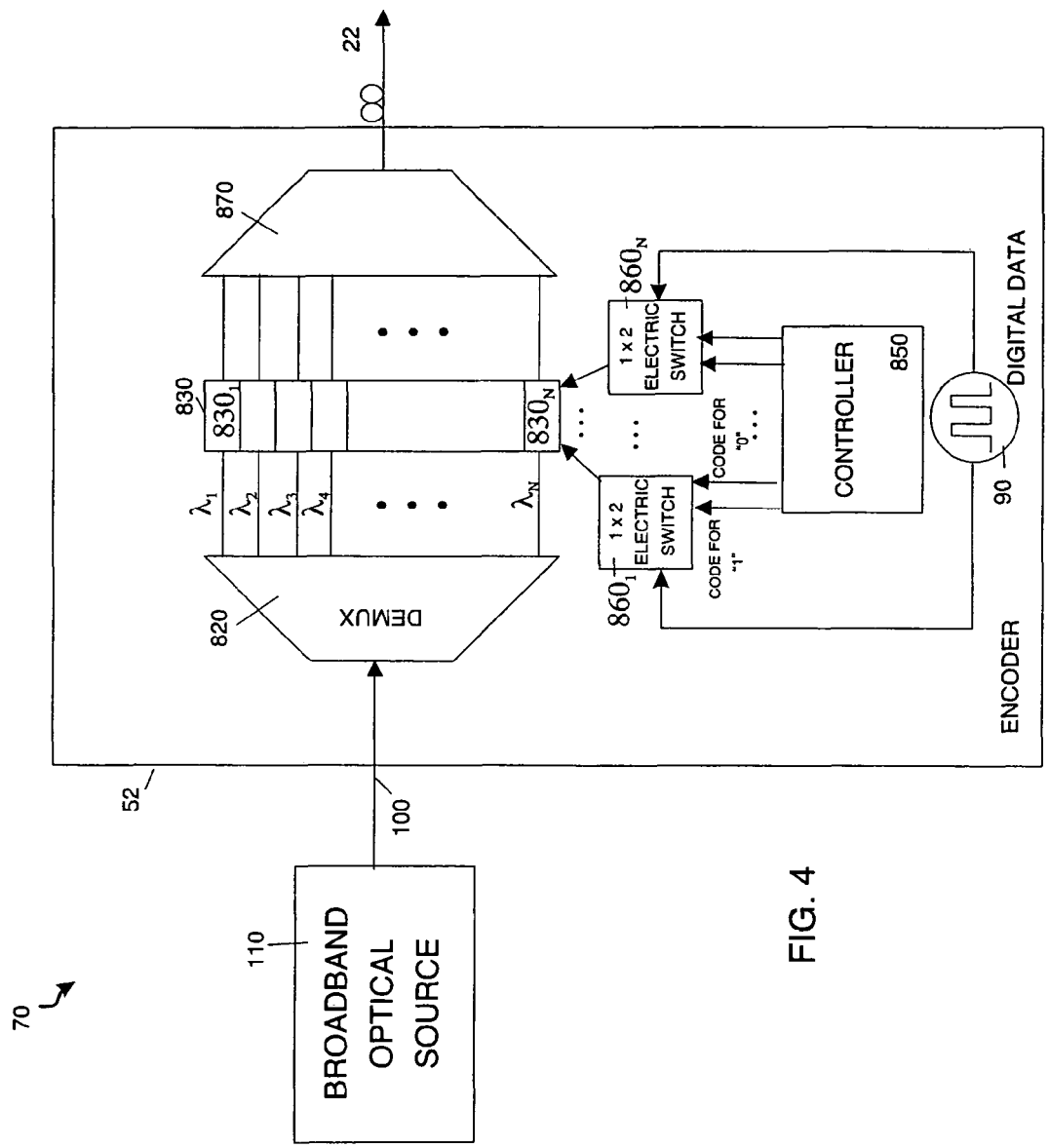
FIG. 4 is block diagram of another exemplary embodiment of an encoder of FIG. 1.

Referring to FIG. 4, in another exemplary embodiment of the Transmitter 70, a digital data 90 may be encoded by an encoder 52 wherein the encoder 52 may be used to change a wavelength code from one bit interval to another in a bipolar fashion or even multiple times within a given data-bit interval.

Referring to FIG. 4, light 100 from a broadband or multi-wavelength optical source 110 may be directed to an optical-wavelength de-multiplexer 820 to be spatially dispersed into separate tones $\lambda_1 \ldots \lambda_N$ with each tone being modulated by modulators $830_1 \ldots 830_N$ within the array 830. Depending on the state of the digital data 90 that is to be encoded by the encoder 52, each modulator $830_1 \ldots 830_N$ within the array 830 may impose a different time-dependent spectral code on the data, including a complementary wavelength code. For example, an N-number of 1×2 electrical switches 860 may be used to switch between a time-dependent spectral code and its complementary time-dependent spectral code. Controller 850 may be used to impose these spectral codes on the data. In this embodiment, the control code output from the controller 850 affects a set of electrical switches 860 that deliver the control signals for the modulators $830_1 \ldots 830_N$ of array 830. The spectral code may be imposed at modulation speeds equal to or greater than the data rate. The modulated optical outputs of all the modulators are then multiplexed together by optical-wavelength multiplexer 870 to form the encoded waveform. The end result is a dynamically-encoded optical data stream 22 in which different sets of wavelength tones can be placed in the different time slots or bit intervals according to the value of the data bit and the code for that bit.

Figure 5:
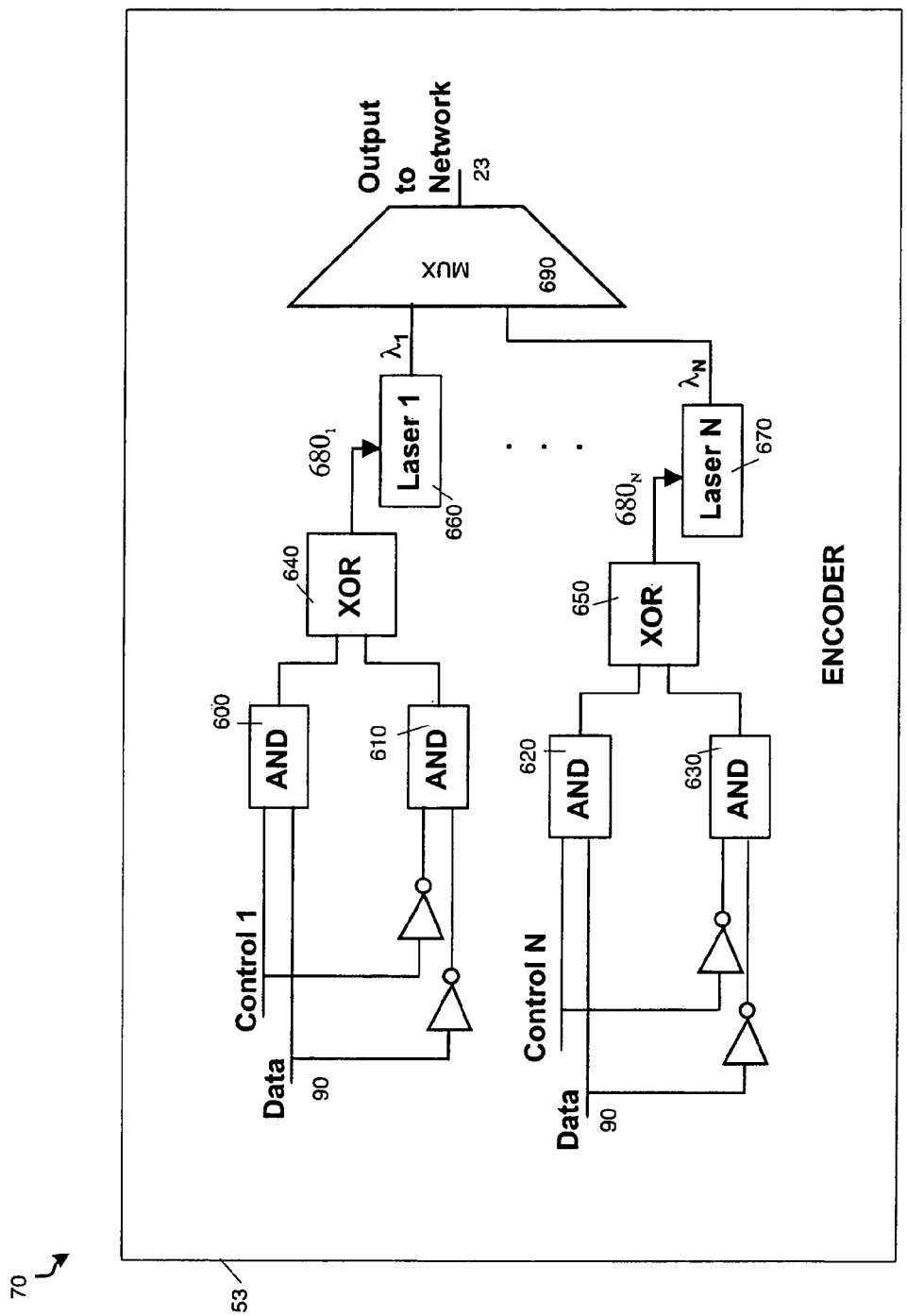
FIG. 5 is block diagram of another exemplary embodiment of an encoder of FIG. 1.

Referring to FIG. 5, in another exemplary embodiment of the Transmitter 70, data 90 may be encoded by the encoder 53 wherein the code determination by the encoder 53 may be implemented primarily in the electrical domain. Using electronic logic gates, for example, AND gates 600, 610, 620, 630 and XOR gates 640, 650, may simplify the encoder 53 by eliminating the optical switches and reducing the number of optical modulators. The code may be thought of as being imposed by N-number of Control lines (i.e. Control 1 . . . . Control N), with each Control line relating to a particular wavelength component of the light. Thus, for each physical channel corresponding to a given wavelength, the optical output of that channel may be determined by combining both the Control line for that channel at that bit interval and the data 90 to be encoded through exemplary AND gates 600, 610, 620, 630 and XOR gates 640, 650. The optical output may be determined on a bit by bit basis. The outputs of exemplary AND gates 600, 610, 620, 630 and XOR gates 640, 650 are a set of control signals $680_1 \ldots 680_N$. These control or modulation signals may be supplied directly to the exemplary lasers 660, 670 that emit at the various wavelengths $\lambda_1 \ldots \lambda_N$. One way to accomplish the equalization of transmitted power is by considering both the code selected channels and the inverse of the code selected channels so that all of the wavelengths are supplied to the output, in a complementary manner, according to whether the data value equals a one or a zero. Another way to accomplish the equalization of transmitted power is to also adjust the drive current levels for the lasers 660, 670 according to the number of lasers that are "turned on" for a data value of one or zero. The outputs of exemplary lasers 660, 670 may be multiplexed together by multiplexer 690 to form the dynamically encoded optical data stream 23.

Referring to FIG. 1, at the Receiver 80, the combined encoded data 30 from all of the users $10_1, 10_2, \ldots, 10_M$ is passed through and decoded by every decoder 60. However, only the portion of the combined encoded data 30 that is matched to the decoder of the intended recipient will yield a bit-pattern that has high signal to noise. The remaining portions of the combined encoded data 30 will look more like noisy waveforms after the decoding.

The following exemplary synchronous decoding scheme enables users to use spectral codes whose lengths need not be limited, repeating from one bit interval or one time-chip interval to the next. Instead, the users can use dynamic codes that change from one bit interval or one time-chip interval to the next.

Figure 6:
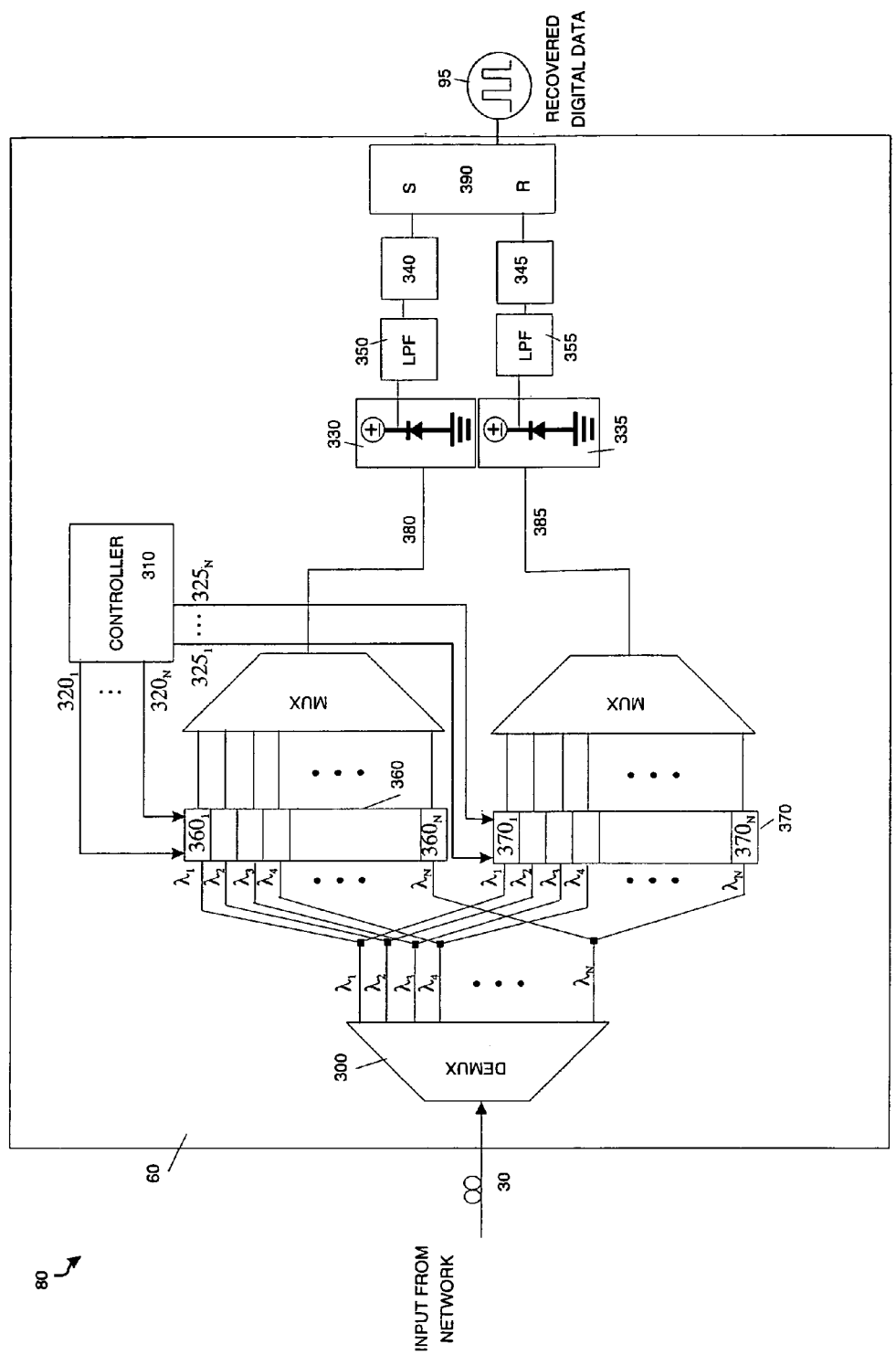
FIG. 6 is block diagram of an exemplary embodiment of a decoder of FIG. 1.

Referring to FIG. 6, in one exemplary embodiment of the Receiver 80, the decoder 60 may be used to decode the input bit stream 30 and recover digital data 95. The optical power of input signal 30, which is the combined encoded data from all of the transmitting users of the network, may be separated into wavelength slots $\lambda_1 \ldots \lambda_N$ by an optical wavelength de-multiplexer 300 and then may be split and directed to two arrays of modulators 360, 370. Array of modulators 360 may, for example, be set to the "1" data bit wavelength code for a given bit or time-chip interval and the array of modulators 370 may, for example, be set to the complementary "0" data bit wavelength pattern. Controller 310 may be used to control optical modulator arrays 360, 370 through control lines $320_1 \ldots 320_N$ and $325_1 \ldots 325_N$ respectfully, wherein the number of control lines $320_1 \ldots 320_N$ corresponds to the number of modulators $360_1 \ldots 360_N$ within array 360, and wherein the number of control lines $325_1 \ldots 325_N$ corresponds to the number of modulators $370_1 \ldots 370_N$ within array 370. If the input data bit has a wavelength pattern that matches the code pattern of that user for that bit interval, the entire signal is passed through one of the modulator arrays 360 or 370, depending on whether that input bit has a value of "1" or "0". No energy is passed through the other modulator array. For codes that do not match code patterns, reduced signal energy is passed by both modulator arrays 360, 370. The wavelength multiplexed outputs 380, 385 may then be sent to a pair of photodetectors 330, 335. These photodetectors combine and detect the optical powers at those wavelengths that are passed by the modulator arrays 360, 370. The outputs of the two photodetectors are then connected through two optional low pass filters 350, 355 to a pair of decision or threshold-detect circuits 340, 345. The low pass filters 350, 355 may remove the power in high frequency components produced as a result of beating or heterodyning of signal portions at different ones of the multiple wavelengths. Many photodetectors also have an inherent low-pass filtering function that may make these optional low pass filters 350, 355 unnecessary. The signal presented to decision circuit 340 is high only if the input has the matching code pattern and the data bit has a value of "1". The signal presented to decision circuit 345 is high only if the input has the matching complementary code pattern and the data bit has a value of "0". These decision circuits compare the inputs presented to them with a preset voltage threshold to determine whether the signal represents valid data for that user or noise (e.g., accumulated data for other users). The outputs of the decision circuits 340, 345 may then be supplied to a circuit, such as a SR flip flop 390, to produce the recovered digital data 95 for that user.

The dynamic-code-sequence control signal for the modulator arrays 360, 370 may be synchronized with the code-matched portion of input signal 30. If the clock signal corresponding to code-matched portion of input signal 30 is also supplied to the Receiver 80, the synchronization task is a simple procedure. However, if the clock signal must be derived from the properly decoded portion of input signal 30, the synchronization or phase-locking process may be quite challenging. An advantage of synchronous decoding is that it can be accomplished with high-speed optical modulators in modulator arrays 360, 370 that can be modulated at the bit rate.

An asynchronous decoder can be achieved that does not require high-speed optical modulators. The asynchronous decoder has multiple decoder modules that are arranged in parallel. Each decoder module provides the match for one possible code piece. The following exemplary asynchronous decoding scheme enables users to use spectral codes that repeat after only a few bits.

Figure 7:
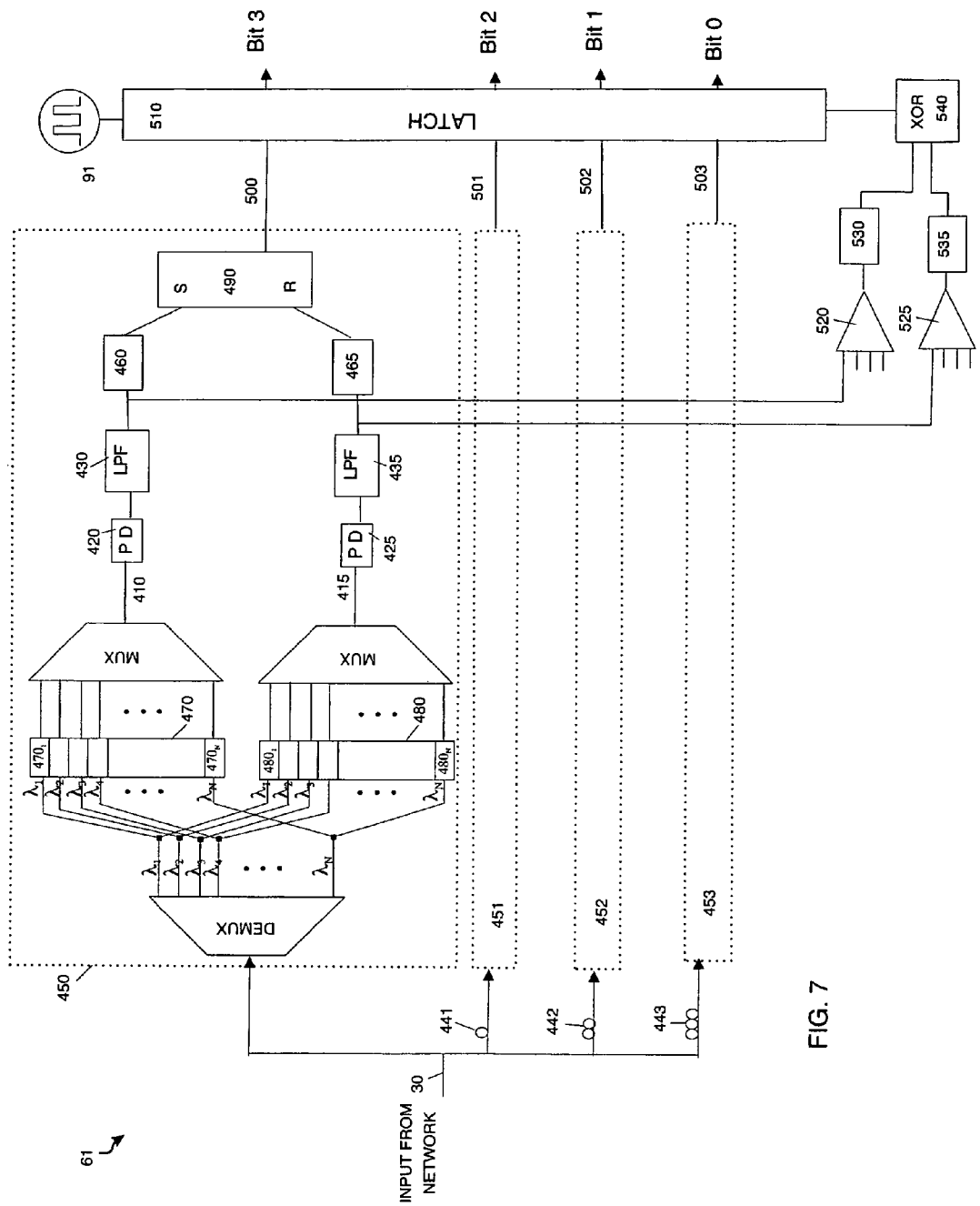
FIG. 7 is block diagram of another exemplary embodiment of a decoder of FIG. 1.

Referring to FIG. 7, in one exemplary embodiment an asynchronous decoder 61 for short temporal sequences of dynamic bipolar encoded data may be used to decode the input signal 30 and recover digital data 93. For illustrative purposes, the dynamic code repeats every four (4) time chips. The asynchronous decoder 61 divides the input data stream four (4) ways and applies delays 441, 442, 443 of 1, 2 and 3, respectively, time-chip intervals to three (3) of those four (4) copies of the input data stream. The fourth copy is not delayed. The copies, delayed and not delayed, may then be processed by the basic decoders 450, 451, 452, 453. For clarity, the details of only decoder 450 are shown. Each basic decoder 450, 451, 452, 453 has a pair of modulator arrays 460, 470 set to match one pattern of the dynamic code. The wavelength multiplexed outputs 410, 415 may then be sent to a pair of photodetectors 420, 425. These photodetectors combine and detect the optical powers at those wavelengths that are passed by the modulator arrays 470, 480. The outputs of the two photodetectors are then connected through two optional low pass filters 430, 435 to a pair of decision or threshold-detect circuits 460, 465. The low pass filters 430, 435 may remove the power in high frequency components produced as a result of beating or heterodyning of signal portions at different ones of the multiple wavelengths. Many photodetectors also have an inherent low-pass filtering function that may make these optional low pass filters 430, 435 unnecessary. The signal presented to decision circuit 460 is high only if the input has the matching code pattern and the data bit has a value of "1". The signal presented to decision circuit 465 is high only if the input has the matching complementary code pattern and the data bit has a value of "0". These decision circuits 460, 465 compare the inputs presented to them with a preset voltage threshold to determine whether the signal represents valid data for that user or noise (e.g., accumulated data for other users). The outputs of the decision circuits 460, 465 may then be supplied to a circuit, such as a SR flip flop 490, to produce the recovered digital data 500, 501, 502, 503 in the associated time-chips and for that user. The recovered digital data chips 500, 501, 502, 503 may then be loaded into a latch 510 that presents the recovered data as 4 chip wide segments. The latch 510 could be configured to present those recovered data segments in parallel format and/or as a serial data stream 91.

The outputs from the photodetectors 420, 425 in the "1" data bit and "0" data bit arms of all four basic decoders also are used to trigger the latch 510. The photodetector outputs, may first be passed through the optional low pass filters. The outputs from photodetectors 420 of basic decoders 450, 451, 452, 453 may be summed together by summing amplifier 520. This summed output may then be delivered to decision circuit 530. The outputs from photodetectors 425 of basic decoders 450, 451, 452, 453 may be summed together by summing amplifier 525. This summed output may then be delivered to decision circuit 535. These decision circuits 530, 535 compare the inputs presented to them with a preset voltage threshold to determine whether the signal represents 4 chips of valid data for that user or noise (e.g., accumulated data for other users). Each chip of data can have a value of either "1" or "0". Thus, the outputs of decision circuits 530, 535 are then combined by an XOR circuit 540. The output of XOR circuit 540 may be used to trigger latch 510. If the output of XOR circuit 540 is high, the most recent four bits or chips of data are considered to have the correct code. The recovered digital data from all four basic decoders are then loaded into a 4-bit register or latch 510. Since the photodetectors 420, 425 are continuously sensing the input stream, the decoder 61 is asynchronous.

Figure 8:
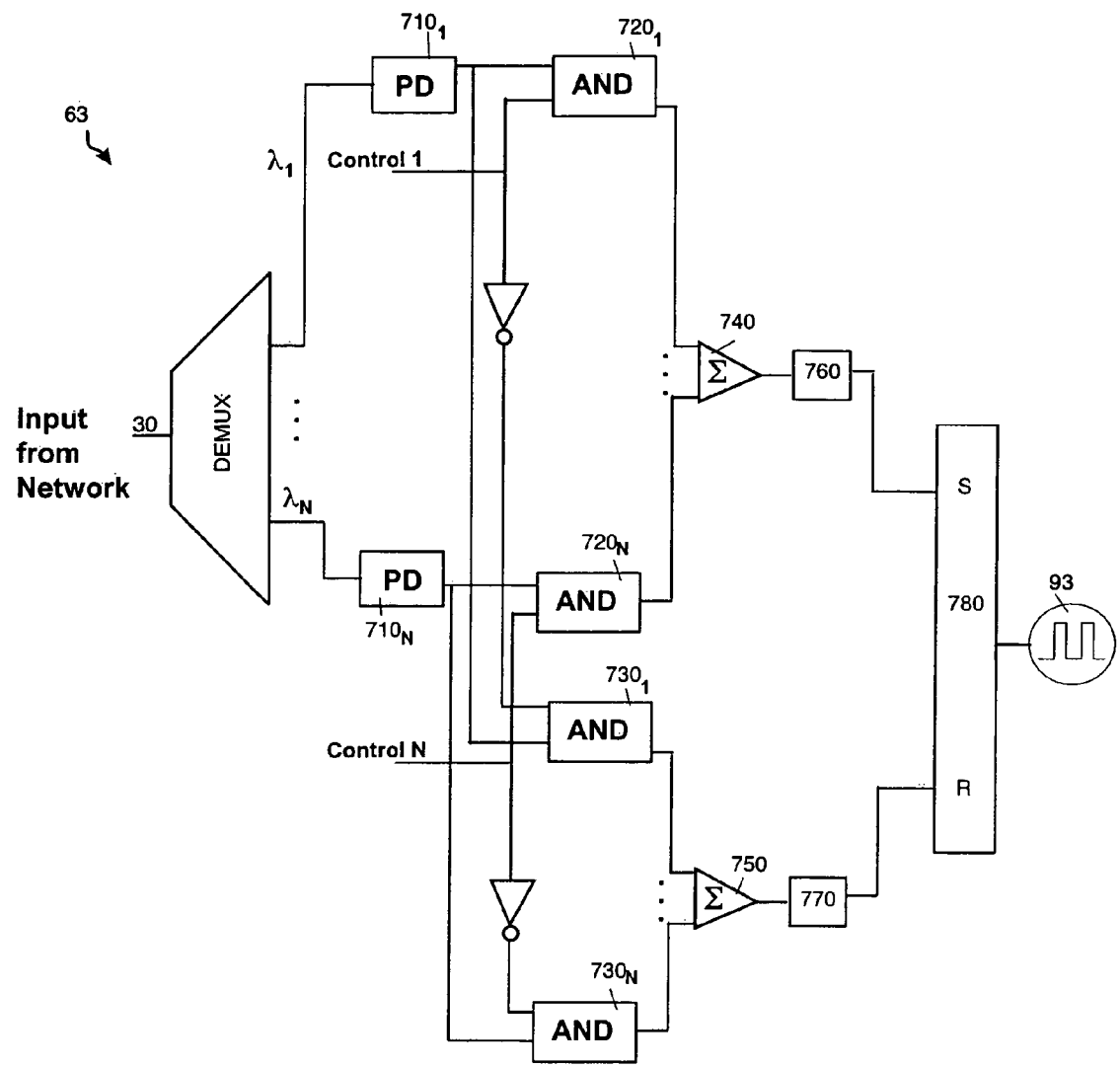
FIG. 8 is block diagram of another exemplary embodiment of a decoder of FIG. 1.

Referring to FIG. 8, in another exemplary embodiment of the Receiver 80, the decoder 63 may have the decoding implemented primarily in the electrical domain. With such an implementation, the optical multiplexers may be eliminated and the two arrays of optical modulators may be replaced with an array of photodetectors $710_1, \ldots, 710_N$. The code may be thought of as having n-number of Control lines (i.e. Control 1 . . . . Control n), with each Control line relating to a particular wavelength component of the light. Thus, for each physical channel corresponding to a given wavelength, the electrical outputs of the photodetectors $710_1, \ldots, 710_N$ associated with each wavelength component $\lambda_1, \ldots, \lambda_N$ may be compared with the Control line for that wavelength channel at that bit interval. Exemplary AND gates $720_1, \ldots, 720_N$ compare the output of photodetectors $710_1, \ldots, 710_N$ with the code pattern for that user, assuming the data has a value of "1" in that bit interval. Exemplary AND gates $730_1, \ldots, 730_N$ compare the output of photodetectors $710_1, \ldots, 710_N$ with the complementary code pattern for that user, assuming the data has a value of "0" in that bit interval. The outputs of AND gates $720_1, \ldots, 720_N$ are then summed by summing amplifier 740. The summed output from amplifier 740 is delivered to a decision or threshold-detector circuit 760. The outputs of AND gates $730_1, \ldots, 730_N$ are then summed by summing amplifier 750. The summed output from amplifier 750 is delivered to a decision or threshold-detector circuit 770. These decision circuits 760, 770 compare the inputs presented to them with a preset voltage threshold to determine whether the signal represents valid data, either having value "1" or "0", for that user or is noise (e.g., accumulated data for other users). The outputs of the decision circuits 760, 770 may then be supplied to a circuit, such as a SR flip flop 780, to produce the recovered digital data 93.

Figure 9:
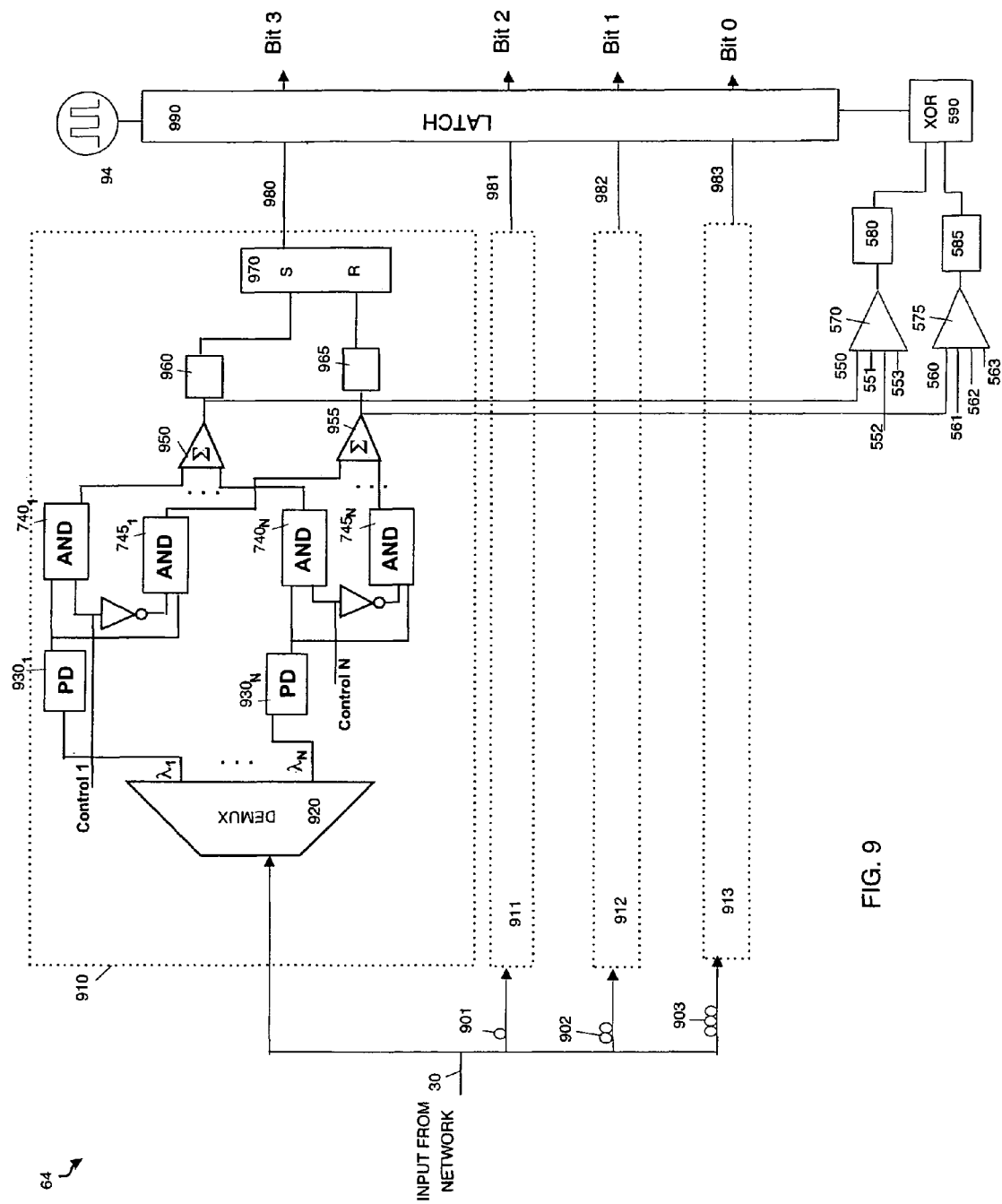
FIG. 9 is block diagram of another exemplary embodiment of a decoder of FIG. 1.

Referring to FIG. 9, in an exemplary embodiment an asynchronous decoder 64 for short temporal sequences of dynamic bipolar encoded data may be used to decode the input signal 30. For illustrative purposes, the dynamic code repeats every four (4) time chips. The asynchronous decoder 64 divides the input data stream four (4) ways and applies delays 901, 902, 903 of 1, 2 and 3, respectively, time-chip intervals to three (3) of those four (4) copies of the input data stream. The fourth copy is not delayed. The copies, delayed and not delayed, may then be processed by the basic decoders 910, 911, 912, 913. For clarity, only decoder 910 is shown. Each basic decoder 910, 911, 912, 913 has a wavelength demultiplexer 920 followed by an array of photodetectors 930. The code may be thought of as having N-number of Control lines (i.e. Control 1 . . . Control n) for each time chip, with each Control line relating to a particular wavelength component of the light. Thus, for each physical channel corresponding to a given wavelength, the electrical outputs of the photodetectors $930_1, \ldots, 930_N$ associated with each wavelength component may be compared with the Control line for that wavelength channel at that time-chip interval. Exemplary AND gates $940_1, \ldots, 940_N$ compare the output of photodetectors $930_1, \ldots, 930_N$ with the code pattern for that user, assuming the data has a value of "1" in that bit interval. Exemplary AND gates $945_1, \ldots, 945_N$ compare the output of photodetectors $930_1, \ldots, 930_N$ with the complementary code pattern for that user, assuming the data has a value of "0" in that bit interval. The outputs of AND gates $940_1, \ldots, 940_N$ are then summed by summing amplifier 950. The summed output from amplifier 950 is delivered to a decision or threshold-detector circuit 960. The outputs of AND gates $945_1, \ldots, 945_N$ are then summed by summing amplifier 955. The summed output from amplifier 955 is delivered to a decision or threshold-detector circuit 965. These decision circuits 960, 965 compare the inputs presented to them with a preset voltage threshold to determine whether the signal represents valid data, either having value "1" or "0", for that user or is noise (e.g., accumulated data for other users). The outputs of the decision circuits 960, 965 may then be supplied to a circuit, such as a SR flip flop 970, to produce the recovered digital data 980, 981, 982, 983 in the associated time-chips and for that user. The recovered digital data chips 980, 981, 982, 983 may then be loaded into a latch 990 that presents the recovered data as 4 chip wide segments. The latch 990 could be configured to present those recovered data segments in parallel format and/or as a serial bit stream 94.

The outputs 550, 551, 552, 553 and 560, 561, 562, 563 from the summing amplifiers 950, 955 in the "1" data bit and "0" data bit arms of all four basic decoders 910, 911, 912, 913 also may be used to trigger the latch 990. The outputs 550, 551, 552, 553 from summing amplifiers 950 of basic decoders 910, 911, 912, 913 may be summed together by summing amplifier 570. This summed output may then be delivered to decision circuit 580. The outputs 560, 561, 562, 563 from summing amplifiers 955 of basic decoders 910, 911, 912, 913 may be summed together by summing amplifier 575. This summed output may then be delivered to decision circuit 585. These decision circuits 580, 585 compare the inputs presented to them with a preset voltage threshold to determine whether the signal presented to latch 990 represents 4 chips of valid data for that user or whether it is noise (e.g., accumulated data for other users). Each chip of data can have a value of either "1" or "0". Thus, the outputs of decision circuits 580, 585 are then combined by an XOR circuit 590. The output of XOR circuit 590 may be used to trigger latch 990. If the output of XOR circuit 590 is high, the most recent four bits or chips of data are considered to have the correct code. The recovered digital data from all four basic decoders are then loaded into a 4-bit register or latch 990. Since the array of photodetectors $930_1, \ldots, 930_N$ are continuously sensing the input stream, the decoder 64 is asynchronous.

Different users can have dynamic codes that extend for different numbers of bits or that have different numbers of possible wavelength patterns. Longer codes (or more possible patterns) will provide greater signal integrity and security. Correspondingly, an asynchronous decoder for that user would need to comprise more channels (parallel legs) of the basic decoder. Thus, a user can select the complexity (and cost) of its decoder according to its needs. Note that a synchronous decoder for dynamically encoded data can be realized with only a single basic decoder. However, in this case, the modulators will have their settings changed from one bit (or sub-bit time interval) to the next, in order to match the dynamically changing wavelength code. Some provision would then need to be made (e.g., with set-up sequences of data that are common to all users) to ensure synchronization between the modulator settings and the input data. For the encoder of FIG. 3 and the decoder of FIGS. 8 and 10, the modulators in the arrays also could have their settings changed, although not necessarily from one bit or time-chip interval to the next. In that way, the code for a given user could be changed, to preserve security.

The dynamic coding approach presently disclosed also may be applied to radio-frequency code-division multiple access (RF-CDMA) systems such as those used for commercial and military wireless communications networks. Conventional RF coding methods involve frequency hopping or phase shifting of the RF carrier within a time chip. Extending this frequency hopping or phase shifting to time chips that cover multiple bit intervals would be one way to increase the signal-transmission quality for certain users of the RF-CDMA system.

The foregoing Detailed Description of exemplary and preferred embodiments is presented for purposes of illustration and disclosure in accordance with the requirements of the law. It is not intended to be exhaustive nor to limit the invention to the precise form(s) described, but only to enable others skilled in the art to understand how the invention may be suited for a particular use or implementation. The possibility of modifications and variations will be apparent to practitioners skilled in the art. Other embodiments are within the scope of the claims. No limitation is intended by the description of exemplary embodiments which may have included tolerances, feature dimensions, specific operating conditions, engineering specifications, or the like, and which may vary between implementations or with changes to the state of the art, and no limitation should be implied therefrom. Applicant has made this disclosure with respect to the current state of the art, but also contemplates advancements and that adaptations in the future may take into consideration of those advancements, namely in accordance with the then current state of the art. It is intended that the scope of the invention be defined by the claims as written and equivalents as applicable. Reference to a claim element in the singular is not intended to mean "one and only one" unless explicitly so stated. Moreover, no element, component, nor method or process step in this disclosure is intended to be dedicated to the public regardless of whether the element, component, or step is explicitly recited in the claims. No claim element herein is to be construed under the provisions of 35 U.S.C. Sec. 112, sixth paragraph, unless the element is expressly recited using the phrase "means for . . . " and no method or process step herein is to be construed under those provisions unless the step, or steps, are expressly recited using the phrase "comprising the step(s) of . . . ."

What is claimed is:

1. A method of transmitting and receiving data in a Code Division Multiple Access (CDMA) system, said method comprising:
    associating a plurality of CDMA codes with a user of said CDMA system;
    coding each bit of data from said user with one of said plurality of CDMA codes, wherein adjacent temporally successive data bit intervals of said data from said user are coded with a different CDMA code of said plurality of CDMA codes;
    transmitting each bit of coded data through said CDMA system;
    receiving the coded data through said CDMA system; and
    decoding data received to determine said each bit of data from said user, wherein the decoding of data is asynchronous with respect to the coding of data.

2. The method of claim 1 wherein said decoding data involves serial to parallel conversion of said data received through said CDMA system so that adjacent temporally successive data bits are coupled into spatially adjacent parallel channels.

3. The method of claim 1 wherein coding each bit of data comprises:
generating multiple optical-wavelengths and directing them to at least one array of optical modulators; and
modulating each optical-wavelength according to CDMA code for said data bit.

4. The method of claim 3 wherein said modulating each optical wavelength further comprises:
using said at least one modulator array to impose a spectral code and a complementary code of said spectral code; and
using a switch to select either one of said spectral code or said complementary code according to the value of said bit of data.

5. The method of claim 3 wherein said modulating each optical wavelength further comprises:
using said at least one modulator array to impose either a spectral code or a complementary code of said spectral code according to the value of said bit of data.

6. The method of claim 3 wherein modulating each optical-wavelength according to a CDMA code for said data bit comprises modulating the intensity of each optical-wavelength using an ON-OFF modulation scheme and wherein at least some optical-wavelengths are modulated ON while other optical-wavelengths are modulated OFF at any given moment in time.

7. The method of claim 1 wherein coding each bit of data comprises:
combining each bit of a CDMA code with each bit of data to be encoded;
generating modulation signals from said combining each bit of a CDMA code with each bit of data to be encoded; and
supplying modulation signals to a plurality of lasers that emit at wavelengths.

8. The method of claim 7 wherein combining each bit of the CDMA code with each bit of data to be encoded is performed using AND and/or XOR logic operation.

9. The method of claim 1 wherein decoding data received further comprises:
separating an incoming data signal into wavelength components to obtain spectrally separated signal;
directing said spectrally separated signal to a first array of optical modulators capable of matching said spectrally separated signal to a spectral code for each bit of data to be decoded;
directing said spectrally separated signal to a second array of optical modulators capable of matching a complementary code of said spectral code for each bit of data to be decoded; and
determining for each bit of data to be decoded whether said data received represents valid data from said user.

10. The method of claim 1 wherein decoding data received comprises:
dividing incoming data signal into a plurality of data signals;
delaying at least one data signal of said plurality of data signals, wherein each of said delaying at least one data signal of said plurality of data signals is delayed a different amount of time equal to a multiple of the bit interval;
separating at least one data signal of said plurality of data signals into wavelength components;
for every said wavelength component, matching said wavelength component with a spectral code associated with each bit of data to be decoded; and
determining for each bit of data to be decoded whether said data received represents valid data from said user.

11. The method of claim 10 wherein decoding data received further comprises:
separating an incoming data signal into wavelength components;
matching said wavelength components with a spectral code associated with each bit of data to be decoded and producing matched wavelength components;
matching said wavelength components with a complementary code of said spectral code associated with each bit of data to be decoded and producing matched complementary wavelength components;
combining said matched wavelength components;
combining said complementary wavelength components; and
determining for each bit of data to be decoded whether said data received represents valid data from said user.

12. A Code Division Multiple Access (CDMA) transmitter comprising:
a first plurality of modulators for encoding a plurality of bits of data from a data stream, each bit in said plurality of bits being encoded with one of a plurality of CDMA codes by modulating said plurality of bits of data according to the CDMA codes, wherein adjacent data bits in said plurality of bits of data are encoded with different ones of the plurality of CDMA codes.

13. The CDMA transmitter of claim 12 wherein the first plurality of modulators are configured to encode each bit of the plurality of bits of data with either a spectral code of said plurality of CDMA codes or with a complementary code of said spectral code of said plurality of CDMA codes, wherein data bits having logic value 1 are coded with the spectral code and data bits having logic value 0 are coded with the complementary code of said spectral code.

14. The CDMA transmitter of claim 13 further comprising a plurality of switches for selecting which bits of data are encoded with the spectral code of said plurality of CDMA codes and which bits of data are encoded with the complementary code of said spectral code of said plurality of CDMA codes.

15. The CDMA transmitter of claim 12 further comprising a second plurality of modulators for coding another plurality of bits from said data stream, each bit in said another plurality of bits being encoded with one of a plurality of CDMA codes by modulating said another plurality of bits of data according to the CDMA codes, wherein adjacent data bits from said data stream in the another plurality of bits are encoded with different ones of the plurality of CDMA codes.

16. The CDMA transmitter of claim 15 wherein the first plurality of modulators are configured to encode the plurality of bits of data with a spectral code of said plurality of CDMA codes and the second plurality of modulators are configured to encode the another plurality of bits of data with a complementary code of said spectral code of said plurality of CDMA codes.

17. The CDMA transmitter of claim 16 further comprising at least one switch for selecting which bits of data are encoded by the first plurality of modulators and which bits of data are encoded by the second plurality of high-speed optical modulators.

18. The CDMA transmitter of claim 15 further comprising a plurality of switches for selecting whether a spectral code or complementary spectral code of said spectral code is selected from the plurality of CDMA codes and encodes a single bit of data in said data stream and for selecting whether another spectral code or complementary spectral code of said another spectral code is selected from the plurality of CDMA codes and encodes an immediately adjacent single bit of data in said data stream.

19. A Code Division Multiple Access (CDMA) transmitter comprising:
   an encoder for coding each bit of data with one of a plurality of CDMA codes, wherein adjacent data bits from a user are coded with different ones of a plurality of CDMA codes, and wherein said encoder comprises:
   a set of modulator arrays for every code within said plurality of CDMA codes, wherein each of said sets imposes a different code of said plurality of CDMA codes and produces a coded signal; and
   at least one optical switch for selecting coded data according to the data bit.

20. A Code Division Multiple Access (CDMA) transmitter comprising:
   an encoder for coding each bit of data with one of a plurality of CDMA codes, wherein adjacent data bits from a user are coded with different ones of a plurality of CDMA codes, and wherein said encoder comprises:
   a first plurality of electronic logic gates for combining each of said plurality of CDMA codes with each bit of data to be encoded;
   a second plurality of electronic logic gates for combining an inverse of each of said plurality of CDMA codes with each bit of data to be encoded;
   a plurality of lasers wherein each laser of a plurality of lasers emits light of a different wavelength, wherein modulation signals control the wavelengths of light produced by said encoder for each bit of said data to be encoded.

21. The method of claim 20 wherein the first plurality of electronic logic gates and the second plurality of electronic logic gates are AND and/or XOR gates.

22. A Code Division Multiple Access (CDMA) receiver comprising:
   a decoder for decoding incoming data, wherein each adjacent bit of said incoming data is separated in time by a multiple of a bit interval and coded with a different CDMA code, wherein the decoding of incoming data is asynchronous with respect to coding of the incoming data, said decoder comprising:
   a means for dividing said incoming data into a plurality of copies, each copy having a different delay which is equal to a multiple of the bit interval;
   a plurality of decoder modules wherein each decoder module receives one of said plurality of copies and produces decoded data bits; and
   a latch for receiving said decoded data bits from said plurality of decoder modules and for outputting decoded data.

23. A Code Division Multiple Access (CDMA) receiver comprising:
   a decoder for decoding incoming data, wherein each adjacent bit of said incoming data is coded with a different CDMA code, wherein the decoding of incoming data is asynchronous with respect to coding of the incoming data, said decoder comprising:
   a demultiplexer capable of separating an incoming signal into a plurality of wavelength components;
   a first array of optical modulators capable of matching a spectral code to said wavelength components;
   a second array of optical modulators capable of matching a complementary code of said spectral code to said wavelength components;
   at least one multiplexer capable of combining wavelength components matched to said spectral code or said complementary code;
   at least one photodetector capable of producing an electrical signal from said plurality of wavelength components; and
   a circuit for determining the binary value, whether "1" or "0", of the decoded data.

24. A Code Division Multiple Access (CDMA) receiver comprising:
   a decoder for decoding incoming data, wherein each adjacent bit of said incoming data is coded with a different CDMA code, wherein the decoding of incoming data is asynchronous with respect to coding of the incoming data, said decoder comprising:
   a set of modulator arrays for every code within said plurality of CDMA codes, wherein each of said sets contains a first modulator array and a second modulator array;
   at least one delay device for delaying an incoming signal, wherein each delay device delays said incoming signal a different amount of time;
   a plurality of demultiplexers for separating said incoming signal into wavelength components, wherein said wavelength components are matched with at least one spectral code associated with each bit of data to be decoded;
   a plurality of photodetectors for converting said wavelength components into electrical signals that can be associated with different ones of said each adjacent bit of data decoded; and
   a device for summing at least two of said electrical signals that can be associated with different ones of said each adjacent bit of data decoded.

25. A Code Division Multiple Access (CDMA) receiver comprising:
   a decoder for decoding incoming data, wherein each adjacent bit of said incoming data is coded with a different CDMA code, wherein the decoding of incoming data is asynchronous with respect to coding of the incoming data, said decoder comprising:
   a demultiplexer capable of separating an incoming signal into wavelength components;
   a plurality of photodetectors for producing electrical signals from said wavelength components;
   a plurality of electronic digital logic gates for combining each of said plurality of CDMA codes with said electrical signals produced from said wavelength components; and
   a plurality of devices for summing at least two of said signals produced from said wavelength components.

26. A Code Division Multiple Access (CDMA) transmitter comprising:
   a first plurality of optical modulators for encoding a plurality of time chips comprising bits of data from a data stream, each time chip in said plurality of time chips being encoded with one of a plurality of CDMA code pieces of CDMA codes by modulating said plurality of time chips according to the CDMA code pieces, wherein adjacent bits in said plurality of bits of date are encoded differently according to the CDMA codes used for the time chips of said adjacent bits.

27. A Code Division Multiple Access (CDMA) transmitter according to claim 26 further comprising at least a second plurality of optical modulators for coding another plurality of time chips of data, each time chip in said second plurality being encoded with one of a plurality of CDMA code pieces of CDMA codes by modulating said another plurality of time chips of data according to the CDMA code pieces of CDMA codes, wherein adjacent bits in said another plurality of time chips of data are encoded differently according to the CDMA codes used for the time chips of said adjacent bits in said another plurality of time chips.

28. The CDMA transmitter of claim 27 wherein the first plurality of optical modulators are configured to encode the plurality of time chips of bits of data with a spectral code of said plurality of CDMA codes and the second plurality of optical modulators are configured to encode the another plurality of time chips of bits of data with a complementary code of said spectral code of said plurality of CDMA codes.

* * * * *